United States Patent
Handrich et al.

(10) Patent No.: US 6,181,428 B1
(45) Date of Patent: Jan. 30, 2001

(54) CLOSED LOOP FIBER OPTIC GYRO WITH SHUPE EFFECT COMPENSATION

(75) Inventors: Eberhard Handrich, Kirchzarten; Manfred Kemmler, Vörstetten, both of (DE)

(73) Assignee: LITEF GmbH (DE)

(*) Notice: Under 35 U.S.C. 154(b), the term of this patent shall be extended for 0 days.

(21) Appl. No.: 09/396,230

(22) Filed: Sep. 15, 1999

(30) Foreign Application Priority Data

Sep. 17, 1998 (DE) .............................................. 198 42 702

(51) Int. Cl.[7] ...................................................... G01C 19/72
(52) U.S. Cl. ............................................ 356/460; 356/464
(58) Field of Search .................................. 356/460, 464, 356/465

(56) References Cited

U.S. PATENT DOCUMENTS

| | | | |
|---|---|---|---|
| 5,329,349 | * 7/1994 | Patterson et al. | 356/465 |
| 5,430,544 | * 7/1995 | Poisel et al. | 356/466 |
| 6,028,668 | * 2/2000 | Rider | 356/460 |

FOREIGN PATENT DOCUMENTS

401124704A * 5/1989 (JP).

* cited by examiner

Primary Examiner—Samuel A. Turner
(74) Attorney, Agent, or Firm—Elliot N. Kramskry

(57) ABSTRACT

A method and a device for compensating Shupe effect drift errors in a fiber gyro that result from time-dependent temperature changes. A closed loop fiber optic gyro includes a VCO control loop and an evaluation unit that incorporates a model which is dependent on the optical path length of light through the fiber coil. The closed loop gyro is arranged to compensate for temperature-dependent drift changes that result from changes in optical path length.

10 Claims, 1 Drawing Sheet

CLOSED LOOP FIBER OPTIC GYRO WITH SHUPE EFFECT COMPENSATION

BACKGROUND

1. Field of the Invention

Figure 1:
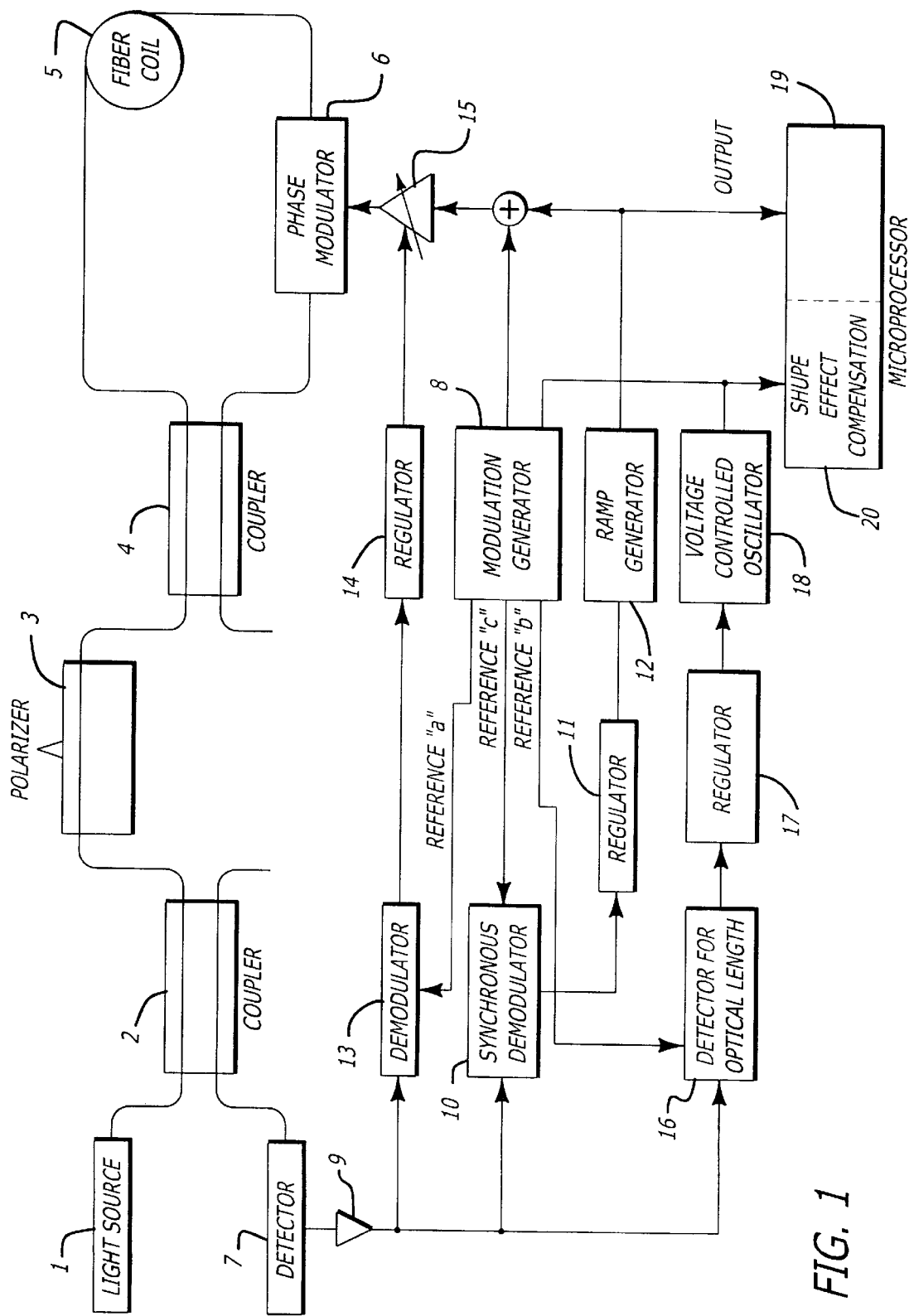

The present invention related to closed-loop fiber optic gyros. More particularly this invention pertains to a method for compensation for temperature-dependent drift changes in a fiber optic gyro, and to a fiber optic gyro that operates according to that method.

2. Description of the Prior Art

In fiber optic gyros, two light beams that originate from a single light source are injected in opposite directions into a fiber coil. Once they have passed through the coil in opposite directions, they are recombined to produce an interference pattern on a detector. If the coil is rotated about its axis, the Sagnac effect generates a non-reciprocal phase shift between the two light beams that produces a shift in the interference pattern. The intensity and direction of the interference shift is proportional to ration direction and rate of the coil about its axis.

When a fiber optic gyro is reset, the detector output signal is processed by electronic control loops to form a non-reciprocal phase shift that is applied to a phase modulator (generally located at one end of the fiber coil) to compensate for the Sagnac phase shift (produced by rotation) between the two counterpropagating light waves. In such fiber optic gyros, the non-reciprocal phase shift to compensate for the interference shift produced by rotation of the coil is dependent upon rotation W in accordance with the following equation:

$$\phi = S \cdot W,$$

where S defines the scale factor. The scale factor S is dependent upon changes in the length of the coil fiber. EP 0 245 118 B1 teaches stabilization of scale factor S by measurement and correction of the fiber length in a gyro. To do this, means are provided for comparing the detector output signal with a signal derived from the phase modulation. This results in the production of a signal that is proportional to the current optical length of the fiber coil. Such signal is employed to control the frequency $f_M$ of the phase modulator such that:

$$f_M = \tfrac{1}{2}\tau = c/2nL$$

In this case, $\tau$ is the time for light to propagate through the coil, c is the speed of light, n is the refractive index of the fiber and L is the length of the fiber on the coil. The term $f_M$ is thus a measure of the optical fiber length of the coil. If the refractive index n is constant, the regulated modulation frequency can be employed (as is known) for scale factor correction to avoid sudden major intensity changes at the detector. If, on the other hand, the refractive index n changes, such scale factor correction is unusable as $f_M$ is dependent on it, but the scale factor S is not.

The above-referenced patent document also fails to address the fact that changes in temperature cause drift changes over time in the fiber gyro that differ for heating and cooling. This behavior, which is known in principle as the Shupe effect, depends indirectly upon the temperature and its time derivatives and—as more detailed investigations show—is influenced by:

the coefficients of expansion of the cladding and core material of the optical fiber, the coating, the adhesive layers and the coil former;

the variation of refractive index with temperature; and the change in the internal pressure in the coil, produced by the materials, mentioned above, being of different coefficients of expansion, which also acts on the refractive index and on the increase in length.

The Shupe effect can be reduced by so-called quadrupole coil winding. With regard to residual drift, which can still be observed, multiple influencing parameters imply that a temperature model dependent upon the temperature T and its time derivatives T' and T", is complex and nonlinear. Repeatability and long-term stability are, therefore, particularly poor since internal pressure differences can be equalized in the long term, particularly in the organic materials employed. Furthermore, temperature sensors cannot be placed in the fiber winding of the coils. Due to the poor thermal conductivity of fiber coils, the termperature measurements generally do not provide a good representation of the coil windings' temperature. Such temperature models for limiting the Shupe effect are known, but offer no satisfactory solutions.

SUMMARY AND OBJECTS OF THE INVENTION

It is therefore an object of the present invention to provide a method for compensation for temperature-dependent Shupe effect drift changes in a fiber optic gyro.

It is yet another object of the invention to provide a fiber optic gyro with compensation of temperature-dependent Shupe effect drift changes.

The present invention addresses the preceding and other objects by providing, in a first aspect, a method for compensation for temperature-dependent drift changes in a fiber optic gyro which are caused by changes of the optical coil length. Such method includes the steps of measuring the optical path length of light through the fiber coil and generating a model of the drift. The source of the drift and therefore the model is dependent upon the variation of the optical pathway of light through the optical fiber coil of the fiber optic gyro. Thereafter, the drift changes in the output signal of the fiber optic gyro are compensated on the basis of the model and of the measurement of the optical path length.

A another aspect, the invention provides an interferometric fiber optic gyro. Such gyro includes an optical fiber which is wound to form a coil. A light source has an output light beam split in a coupler into at least two beam elements that counterpropagate through the fiber. Means are provided for recombining the beam elements to form an interference pattern once the beam elements have exited the optical fiber. A detector is provided to which the interference pattern is applied to produce a signal that indicates the intensity of the interference pattern. An evaluation unit determines the rotation acting on the fiber coil as a function of the output signal of the detector. Means are additionally provided for compensating for temperature-dependent drift changes of the gyro as a function of the change of the optical length of the fiber.

The preceding and other features of the present invention will become further apparent from the detailed description that follows. Such description is accompanied by a drawing figure. Numerals of the drawing FIGURE correspond to those of the written description with like numerals referring to like features throughout both the drawing figure and the written text.

BRIEF DESCRIPTION OF THE DRAWING FIGURE

The FIGURE is a schematic block diagram of a fiber optic gyro in accordance with the invention.

DETAILED DESCRIPTION OF THE PREFERRED EMBODIMENT

The present invention is based upon the fact that changes in optical path length n·L (where n is the retractive index of the optical fiber and L is its length), whose physical differences express themselves via asymmetries of the winding, are the direct influencing variables on the Shupe effect. The invention provides a model for compensation of the Shupe effect derived from the measurement of optical path length n·L. The drift bias in the output signal of the fiber optic gyro is compensated on the basis of such model. As discussed earlier $f_M$ is a direct measure of n·L.

The invention primarily compensates for the residual Shupe effect via the modulation frequency $f_M$, where $f_M$ is regulated by a VCO control loop assigned to the fiber optic gyro. That is, $$f_M = 1/2\tau = c/2nL$$

It is essential that model behavior is repeatable and stable in the long run due to measurement of the direct influencing variable.

The FIGURE is a block diagram of a closed-loop fiber optic gyro in accordance with the invention, only a minimal configuration being illustrated with respect to the actual inferometer. The inferometer includes a light source 1 (e.g. a superluminescent diode (SLD)), whose output light beam passes through a first coupler 2 then through a polarizer 3 to a second coupler 4 and is split into clockwise and counter-clockwise light beam elements. The light beam elements are recombined at the second coupler 4 after passing through a coil 5. Thereafter, they pass through the first coupler 2 to a photodetector 7 that supplies a signal (corresponding to the intensity of the resultant superposition of the two combined light beam elements) via an amplifier 9 to an electronic signal processing circuit (described below). When the gyro is at rest (no rotation of the coil 5), no phase difference exists between the two light beam elements. When the coil is rotated about its sensitive or input axis, a non-reciprocal phase shift occurs due to the Sagnac effect. As a result, light intensity at the detector 7 varies. For the gyro to operate at the most sensitive region with respect to the magnitude and direction of the signal detected, a phase difference of $\pm n\cdot\pi/2$ (H=1, 3, 5. . . ) is generated between the two light beam elements by a phase modulator 6. A modulation generator 8 acts via a controllable amplifier 15 on the phase modulator 6 and is excited via a VCO (i.e. a voltage controlled loop, described below) that includes, for example, a detector 16 for the optical length, a regulator 17 and a voltage-controlled oscillator 18. The changeover in the excitation of the phase modulator 6 takes place in synchronization with the time of propagation of light through the coil 5. The output signal of the photodetector 7 passes, through the amplifier 9, together with the reference of the modulation generator 8, to a synchronous demodulator 10 that demodulates the detector signal. The synchronous demodulator 10 supplies a signal indicative of the direction of the phase shift at the detector 7 that is integrated by a regulator 11 and applied to a ramp generator 12. The ramp generator 12 acts on the phase modulator 6 to produce a non-reciprocal phase shift between the two light beam elements that pass through the coil 5 to compensate the phase shift produced by rotation of the coil 5. Due to its periodic characteristic, a phase change of $2\pi$ should produce no signal at the detector 7. If the modulator scale factor is not accurately adjusted, a signal is detected at the demodulator 13 with the reference "a" from the modulation generator 8 and the controllable amplifier 15 is controlled, via a regulator 14, so that the error signal disappears. The output signal of the amplifier 9 also acts on the optical detector 16, which is additionally fed the input signal (which produces synchronization to the time of propagation of light through the coil 5) with the reference "b" of the modulation generator 8. The optical length detector 16 produces an output voltage which is, on the one hand, dependent on whether the changeovers in the intensity signal of the detector 7 occur too early or too late with regard to the phase changeover and, on the other hand, also dependent on the durations of the changeover pulses. The output signals from the optical length detector 16 are amplified by a regulator 17, whose output, in turn, excites a voltage-controllable oscillator 18, feeding and synchronizing the modulation generator 8.

The output of a ramp generator 12 is applied to a microprocessor 19 that determines and provides the corrected amplitude and direction of rotation.

The fiber optic gyro thus described so far differs from that taught by EP 0 245 118 B1, inter alia, in that the frequency of the voltage-controlled oscillator 18 is not employed for correction of scale factor due to dependence upon the refractive index n. In fact, the output of the voltage-controlled oscillator 18 is applied to a further input of the microprocessor 19 to compensate for the Shupe effect, supra. A model of drift due to the Shupe effect of the respective fiber optic gyro is stored in the module referred to as Shupe effect compensation 20.

This drift model is a function of the optical path length n·L of the light path through the fiber coil 5. The microprocessor 19 employs the output signal received to correct the calculated amplitude and direction of the rotation of the fiber coil 5. The correction of optical wavelength is obtained in this embodiment through the modulation frequency $f_M$ of the VCO in the control loop 16, 17, 18.

The model of temperature-dependent drift may depend, for example, on the modulation frequency $f_M$ but it primarily dependent on its first and second derivatives with respect to time, $f_M'$ and $f_M''$. In practice, the model is obtained, for example, by recording the time profile of the gyro modulation frequency, the time derivatives of temperature and the time profile of temperature-dependent drift. This model of the temperature-dependent drift determined, for example, by experiment, corresponds, for example, to a higher-order polynomial or, in specific cases, to a linear function of $f_M$.

Shupe effect compensation 20 may be either a computation module that calculates a compensation value as a function of the applied modulation frequency $f_M$, or configured as a look-up table, from which an associated compensation value, corresponding to the applied modulation frequency $f_M$, is read.

The compensation value may be selected so that, in order to correct microprocessor 19 output, it is simply added to the result previously calculated by the microprocessor 19; that is, it acts directly upon the output signal of the microcomputer. It may also be selected to act in a suitable form on the calculation (carried out in the microprocessor 19) of the magnitude and direction of rotation.

While this invention has been described with reference to its presently-preferred embodiment, it is not limited thereto. Rather, the invention is limited only insofar as it is defined by the following set of patent claims and includes within its scope all equivalents thereof.

What is claimed is:

1. A method for compensating temperature-dependent drift changes in a fiber optic gyro comprising the steps of:
    a) measuring the optical path length of light through the fiber coil; and b) generating a model of the temperature-dependent drift, said model being dependent upon the optical pathway of light through the optical fiber coil of the fiber optic gyro; and then c) compensating for the drift changes in the output signal of the fiber optic gyro on the basis of the model and measurement of the optical path length of the fiber coil.

2. A method as defined in claim 1 wherein the optical path length of the light is measured by means of a modulation frequency produced by a VCO control loop.

3. A method as defined in claim 2 wherein said model of temperature-dependent drift is obtained as a function of modulation frequency, its first time derivative and/or its second time derivative.

4. A method as defined in claim 2 wherein said model of temperature-dependent drift is generated empirically by the time profile of the modulation frequency and its time derivatives being detected for said fiber optic gyro as a function of the temperature and the time profile of the temperature-dependent drift.

5. A method as defined in claim 1 wherein said model of the temperature-dependent drift is obtained via a polynomial rule.

6. A method as defined in claim 1 wherein said model of temperature-dependent drift is linear.

7. A method as defined in claim 1 wherein, to compensate for drift changes in a gyro output signal, a compensation value is calculated in each case based on the model formed and applied to the output signal.

8. A method as defined in claim 1 wherein, in order to compensate for drift changes in an output signal of the fiber optic gyro, a compensation value calculated on the basis of the model formed is, in each case, read from a memory, and influences the output signal.

9. An interferometric fiber optic gyro comprising, in combination;

a) an optical fiber wound to form a coil;

b) a light source whose output light beam is split in a coupler into at least two beam elements which counterpropagate through the fiber;

c) means for recombining the beam elements to form an interference pattern once the beam elements have exited the optical fiber;

d) a detector to which said interference pattern is applied to produce a signal which indicates the intensity of said interference pattern;

e) an evaluation unit for determining the rotation acting on the fiber coil as a function of the output signal of said detector; and f) means for compensating for temperature-dependent drift changes of said gyro as a function of the change of the optical length of the fiber.

10. A gyro as defined in claim 9 further including:

a) means for compensation for changes of the length of the optical fiber including a VCO control loop; and b) said means for compensation for the temperature-dependent drift changes of the gyro includes a model which is dependent on an output signal of said VCO control loop to produce correction values for said evaluation unit.

* * * * *